United States Patent
Muraki (10) Patent No.: US 7,551,204 B2
(45) Date of Patent: Jun. 23, 2009

(54) IMAGING APPARATUS HAVING A COLOR IMAGE DATA MEASURING FUNCTION

(75) Inventor: Jun Muraki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1059 days.

(21) Appl. No.: 10/935,462

(22) Filed: Sep. 7, 2004

(65) Prior Publication Data

US 2005/0057665 A1    Mar. 17, 2005

(30) Foreign Application Priority Data

Sep. 11, 2003    (JP)    ............... 2003-319812

(51) Int. Cl.
*H04N 5/228*    (2006.01)

(52) U.S. Cl. ................. 348/222.1; 348/223.1; 382/167; 358/515; 358/516; 358/518

(58) Field of Classification Search ............. 348/222.1, 348/223.1
See application file for complete search history.

(56) References Cited

U.S. PATENT DOCUMENTS

| | | | |
|---|---|---|---|
| 5,038,205 A * | 8/1991 | Kondo et al. ............. 348/225.1 |
| 5,202,935 A * | 4/1993 | Kanamori et al. .......... 382/162 |
| 5,221,963 A * | 6/1993 | Hashimoto et al. .......... 348/234 |
| 5,508,739 A * | 4/1996 | Suh ........................ 348/223.1 |
| 6,008,912 A * | 12/1999 | Sato et al. .................. 358/518 |
| 6,665,007 B1 * | 12/2003 | Usami ...................... 348/223.1 |
| 2001/0009438 A1 * | 7/2001 | Kihara et al. ............... 348/223 |
| 2001/0016064 A1 * | 8/2001 | Tsuruoka et al. ............ 382/167 |
| 2002/0041332 A1 * | 4/2002 | Murata et al. ............... 348/272 |

FOREIGN PATENT DOCUMENTS

| | | | |
|---|---|---|---|
| JP | 60-154795 A | | 8/1985 |
| JP | 60154795 A | * | 8/1985 |
| JP | 3-132280 A | | 6/1991 |
| JP | 3-185975 A | | 8/1991 |
| JP | 7-143393 A | | 6/1995 |

OTHER PUBLICATIONS

Notification Concerning Transmittal of Copy of International Preliminary Report on Patentability, Chapter I of the Patent Cooperation Treaty for PCT/JP2004/012916, 8 sheets.

(Continued)

*Primary Examiner*—Tuan V Ho
*Assistant Examiner*—Cynthia Calderon
(74) *Attorney, Agent, or Firm*—Frishauf, Holtz, Goodman & Chick, P.C.

(57) ABSTRACT

A post-processor circuit subjects color processing to an output data of an imaging device, that is, CCD. The post-processor circuit is provided with RGB measurement circuits. Measurement points are located before and after processing circuits. RGB data obtained at these measurement points are selectively captured into the RGB measurement circuits to make measurement. By doing so, color data at a required portion is measured without using software processing, therefore, the measurement result is simply and rapidly obtained.

16 Claims, 8 Drawing Sheets

OTHER PUBLICATIONS

Patent Abstracts of Japan, vol. 0093, No. 25 (E-368), Dec. 20, 1985 and JP 60-154795 A (Sony Corp.), Aug. 14, 1985—Abstract only.
Patent Abstracts of Japan, vol. 1999, No. 12, Oct. 29, 1999 and JP 11-178006 A (Sony Corp.), Jul. 2, 1999—Abstract only.
Patent Abstracts of Japan, vol. 2006, No. 04, Aug. 31, 2000 and JP 2000-032492 A (Casio Computer Co. LTD.., Jan. 28, 2000—Abstract only.

* cited by examiner

| LeftTop | X=0 | 1 | 2 | ··· | ··· | 14 | 15 |
|---|---|---|---|---|---|---|---|
| 0 | 0 | 1 | 2 | ··· | ··· | 14 | 15 |
| 1 | 16 | 17 | 18 | ··· | ··· | 30 | 31 |
| ··· | ··· | | | ··· | | ··· | ··· |
| 14 | 224 | 225 | 226 | ··· | ··· | 238 | 239 |
| 15 | 240 | 241 | 242 | ··· | ··· | 254 | 255 |

|  | R COEFFICIENT | G COEFFICIENT | B COEFFICIENT | OFFSET |
|---|---|---|---|---|
| R MEASUREMENT | 1.0 | 0 | 0 | 0 |
| Y MEASUREMENT | 0.3 | 0.59 | 0.11 | 0 |
| BALANCE OF R AND B | 0.5 | 0 | -0.5 | 0.5 |

FIG.11

IMAGING APPARATUS HAVING A COLOR IMAGE DATA MEASURING FUNCTION

CROSS-REFERENCE TO RELATED APPLICATIONS

This application is based upon and claims the benefit of priority from prior Japanese Patent Application No. 2003-319812, filed Sep. 11, 2003, the entire contents of which are incorporated herein by reference.

BACKGROUND OF THE INVENTION

1. Field of the Invention

The present invention relates to a color imaging apparatus such as a digital camera. In particular, the present invention relates to an imaging apparatus having a color image data measuring function, and to a method of measuring a color image data used therefor.

2. Description of the Related Art

Conventionally, a digital camera has various functions as described below. One is an auto-focus (AF) function of automatically focusing an object. Another is an auto-exposure (AE) function of automatically determining exposure. Another is an auto white balance (AWB) function of correcting the difference of color tone variable by light source, and automatically adjusting white balance. Users can obtain high-quality image data with a simple operation using the foregoing functions.

Conventionally, there have been known various proposals relevant to the method of measuring RGB data required for controlling the foregoing functions. Usually, this kind of digital camera is provided with an RGB measurement circuit as hardware. The RGB measurement circuit measures RGB data for each pixel of an image, and evaluates the measured result, thereby controlling the various functions described above. In general, the RGB measurement circuit is composed of circuits for integrating each color component of the RGB data for each predetermined area.

Figure 1:
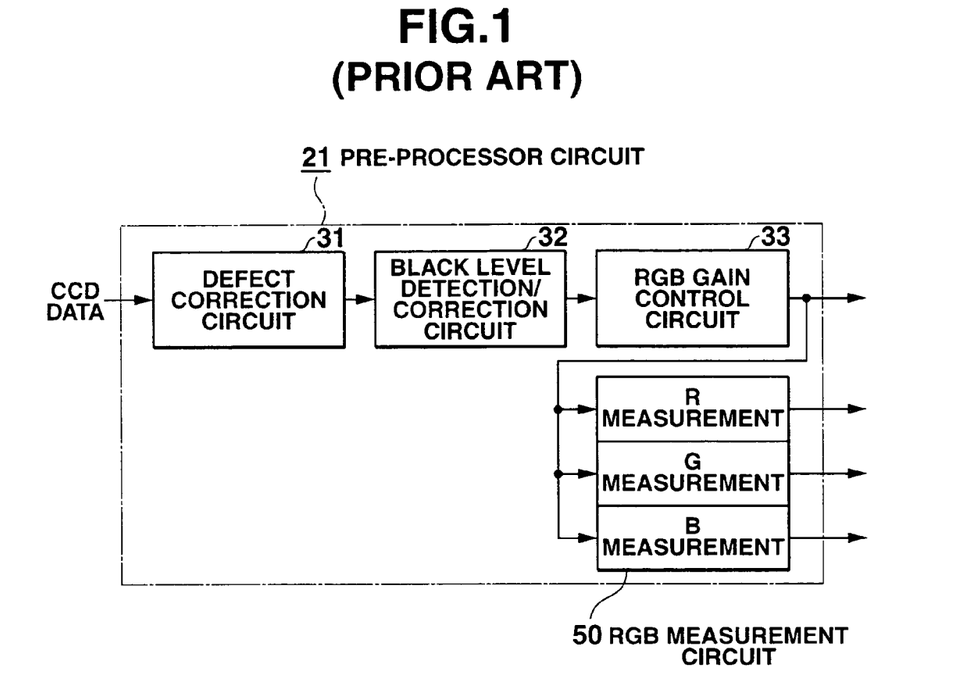
FIG. 1 is a block diagram showing the configuration of a pre-processor circuit in a conventional digital camera.
Figure 2:
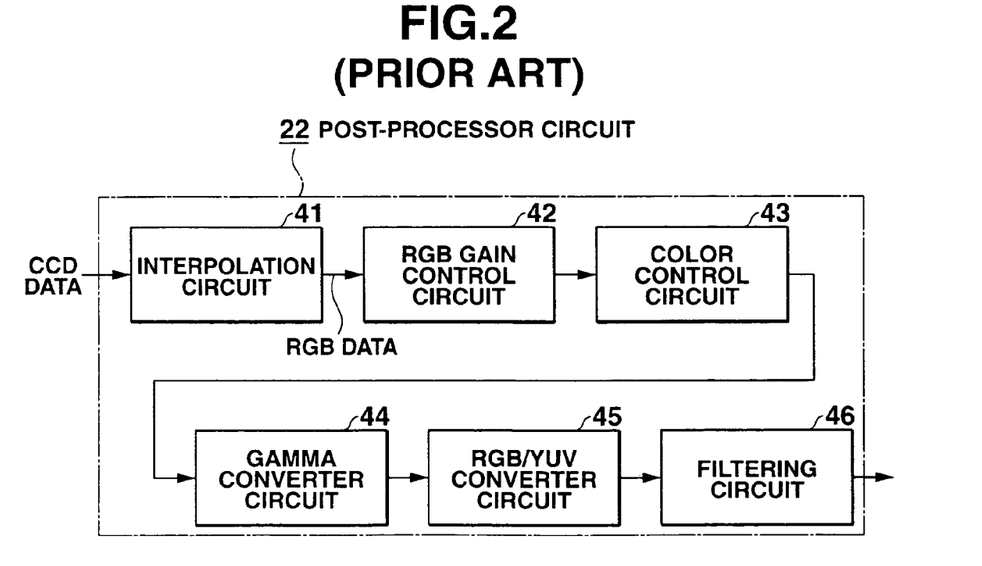
FIG. 2 is a block diagram showing the configuration of a post-processor circuit in the conventional digital camera.
Figure 3:
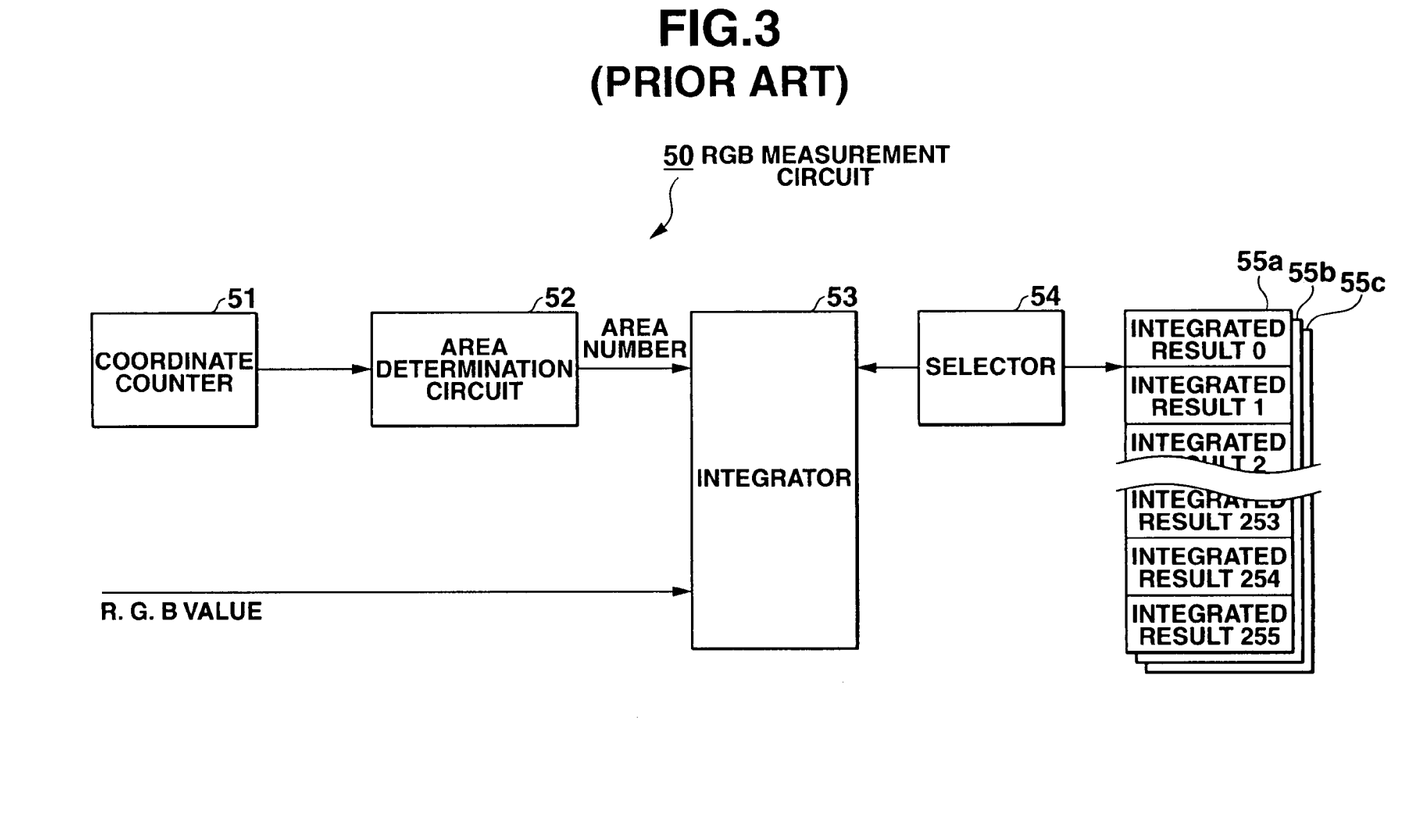
FIG. 3 is a block diagram showing the configuration of an RGB measurement circuit built in the pre-processor circuit in the conventional digital camera.
Figure 4:
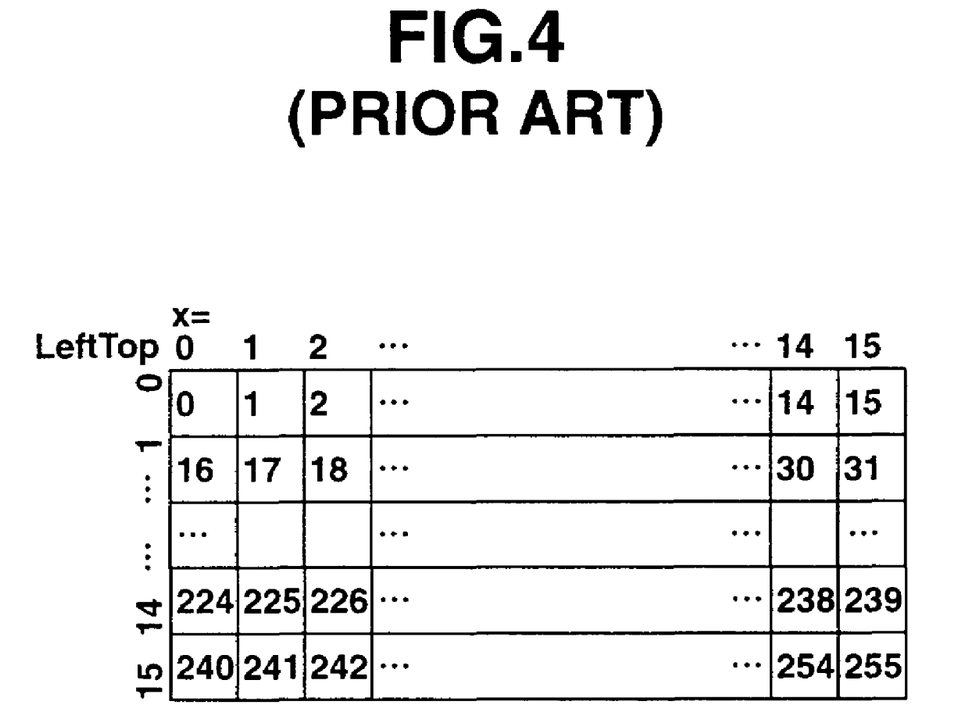
FIG. 4 is a chart showing the relationship between images and area numbers.

A conventional RGB measurement circuit used for a digital camera will be explained below with reference to FIG. 1 to FIG. 4. FIG. 1 is a block diagram showing the configuration of pre-processor circuit in the conventional digital camera. FIG. 2 is a block diagram showing the configuration of post-processor circuit. FIG. 3 is a block diagram showing the configuration of an RGB measurement circuit built in the pre-processor circuit. FIG. 4 is a chart showing the relationship between images and area numbers.

In the digital camera, the output of imaging device, that is, a charge coupled device (CCD) is colorized using a color filter having three primary colors R, G and B arrayed in a predetermined sequence. The output of the CCD is an electric signal (analog signal). The output signal is converted into a digital signal by an analog processing circuit located on the post-stage of the CCD, and thereafter, input to a signal processing circuit calling pre-process. The entire system configuration of the digital camera will be described later with reference to FIG. 5.

As shown in FIG. 1, a pre-processor circuit 21 is composed of defect correction circuit 31, black level detection/correction circuit 32 and RGB gain control circuit 33. The defect correction circuit 31 corrects a pixel of CCD having defect using neighboring pixels. The black level detection/correction circuit 32 detects a black level portion of an image, and corrects it into a proper value. The RGB gain control circuit 33 makes an RGB gain control. CCD data processed via the pre-processor circuit 21 is loaded into a buffer memory comprising DRAM, and thereafter, supplied to a post-processor circuit 22 as seen from FIG. 2.

The "CCD data" means a signal, which is successively output from the CCD at the unit of pixel according to the color array of the color filter. For example, if a primary color filter having primary colors R, G and B arrayed like a Bayer array is used, the CCD data is also called as "primary color lattice array data). The "RGB data" means data having averaged R, G and B color component values for each pixel, and also, is called "color data".

The post-processor circuit 22 is a signal processing circuit for carrying out color process with respect to the CCD data loaded into the buffer memory. The post-processor circuit 22 is composed of interpolation circuit 41, RGB gain control circuit 42, color control circuit 43, gamma converter circuit 44, RGB/YUV converter circuit 45 and filtering circuit 46. The interpolation circuit 41 interpolates color lacking for each pixel to generate RGB color data. The RGB gain control circuit 42 makes the gain control of the RGB data generated by the interpolation circuit 41. The color control circuit 43 is used for emphasizing a predetermined color. The gamma converter circuit 44 makes a conversion in accordance with gamma characteristics of display. The RGB/YUV converter circuit 45 makes a conversion from RGB signal into YUV signal. The filtering circuit 46 shapes the waveform of the YUV signal.

The foregoing color process by the post-processor circuit 22 is made, and thereby, image data composed of a luminance signal equivalent to one screen and color difference signal is generated. The image data is displayed on a display device while being compressed according to a predetermined format at a depressed timing of a shutter key, and recorded in memory.

In the conventional digital camera, an RGB measurement circuit 50 is built in the pre-processor circuit 21 as seen from FIG. 1, and RGB measurement is made using CCD output data before being loaded into the buffer memory.

In FIG. 3, there is shown the configuration of the RGB measurement circuit 50. The RGB measurement circuit 50 is composed of coordinate counter 51, area determination circuit 52, integrator 53, selector 54 and register groups 55a to 55c.

The CCD data extracted from the output section of the pre-processor circuit 21 is separated into data for each RGB color component, and input to the integrator 53. On the other hand, the coordinate counter 51 generates an input value coordinate. Here, the measuring object image is divided into a predetermined-size area (e.g., 16×16=256). In this case, the area determination circuit 52 determines that the input value coordinate from the coordinate counter 51 belongs to which area, and thereafter, outputs the area number to the integrator 53.

FIG. 4 shows the corresponding relationship between images and areas. For example, if the image is divided into areas (16×16=256), area numbers 0 to 255 is given for each area.

Register groups 55a to 55c comprises 256 registers corresponding to the number of divided areas of the image. Each register is provided corresponding to the area numbers 0 to 255. The register groups are prepared for each color in a manner that the register group 55a is used for R data, the register group 55b is used for G data, and the register group 55c is used for B data. The selector 54 selects the register groups 55a to 55c in accordance with R, G and B color data successively input to the integrator 53 in time series.

With the foregoing configuration, when the area number of the input value determined by the area determination circuit 52 is input to the integrator 53, the integrator 53 measures R, G and B values (integration value) relevant to the area number. In this case, R, G and B color data are successively input to the integrator 53; for this reason, measurement is made for each color while the selector 54 selects the register groups 55a to 55c.

For example, if R data is input to the integrator 53, the selector 54 selects the register group 55a for R data. In this state, the integrator 53 reads the value corresponding to the area number output from the area determination circuit 52 from the corresponding register of the register group 55a. Further, the integrator 53 adds the input value to the read value, and thereafter, write it as integration result. Measurement relevant to other color data is carried out in the same manner as described above. In brief, when G data is input, the selector 54 selects the register group 55b for G data, and the integrator 53 reads the value corresponding to the area number from the register group 55b. The integrator 53 adds the input value to the read value, and thereafter, writes it. Likewise, when B data is input, the selector 54 selects the register group 55c for B data, and the integrator 53 reads the value corresponding to the area number from the register group 55c. The integrator 53 adds the input value to the read value, and thereafter, writes it.

In this manner, R, G and B values (integration value) of each area of the image are successively measured, and thereafter, the measured result is stored in register groups 55a to 55c corresponding to each color. The RGB measured results stored in these register groups 55a to 55c are read via control unit, that is, CPU, and used for the control of AE and AWB functions.

BRIEF SUMMARY OF THE INVENTION

According to one aspect of the present invention, there is provided an imaging apparatus comprising:
an imaging unit capable of color imaging;
a first processing unit which carries out predetermined color processing with respect to color image data output from the imaging unit;
a first extraction unit which extracts color image data before the predetermined color processing is carried out by the first processing unit;
a second extraction unit which extracts color image data after the predetermined color processing is carried out by the first processing unit;
a select unit which selects one of several color image data extracted by the first and second extraction units; and
a measurement unit which makes predetermined measurement based on the color image data selected by the select unit.

According to another aspect of the present invention, there is provided an imaging apparatus comprising:
an imaging device capable of color imaging;
a first processing circuit which carries out a predetermined pre-process with respect to color image data output from the imaging device;
a buffer memory which holds color image data output from the imaging device, which is subjected to a predetermined process by the first processing circuit, by at least one screen;
a second processing circuit which carries out predetermined color processing with respect to color image data read from the buffer memory; and
a measurement circuit located on the side of the second processing circuit of the first and second processing circuits, the measurement circuit measuring color image data obtained by the second processing circuit.

According to another aspect of the present invention, there is provided an imaging apparatus comprising:
an imaging device capable of color imaging;
a processing circuit which carries out predetermined color processing with respect to color image data output from the imaging device;
a measurement value generator circuit which multiplies each color component of the color image data subjected to predetermined color processing in the processing circuit by a coefficient set by a measurement object, thereby to generate a measurement value corresponding to the measurement object; and
a measurement circuit which makes a predetermined measurement based on the measurement value generated by the measurement value generator circuit.

According to another aspect of the present invention, there is provided an imaging apparatus comprising:
an imaging device capable of color imaging;
a processing circuit which carries out predetermined color processing with respect to color image data output from the imaging device;
a first data select circuit which selects one of area number data showing each area when the color image data is divided into a predetermined size and color image data input as a measurement object from the processing circuit;
a second data select circuit which selects one of the color image data and a fixed value data used for a specified measurement object in response to a data select operation by the first data select circuit;
a plurality of memories provided correspondingly to the area number data, and
a measurement circuit which makes a predetermined measurement based on the color image data selected by the second data select circuit when the first data select circuit selects the area number data, and writing the result in one of the memories corresponding to the area number data, while writing the fixed value data selected by the second data select circuit in one of the memories corresponding to the color image data when the first data select circuit selects the color image data.

According to another aspect of the present invention, there is provided an imaging apparatus comprising:
an imaging means capable of color imaging;
first processing means for carrying out predetermined color processing with respect to color image data output from the imaging means;
first extraction means for extracting color image data before the predetermined color processing is carried out by the first processing means;
second extraction means for extracting color image data after the predetermined color processing is carried out by the first processing means;
select means for selecting one of several color image data extracted by the first and second extraction means; and
measurement means for making predetermined measurement based on the color image data selected by the select means.

According to another aspect of the present invention, there is provided a method of measuring a color image data, comprising:
a step of carrying out predetermined color processing with respect to a color image data output from an imaging device;
a step of extracting color image data before the predetermined color processing is carried out and color image data after the predetermined color processing is carried out;
a step of selecting one of the extracted color data; and a step of making measurement based on the selected color image data.

DETAILED DESCRIPTION OF THE INVENTION

Embodiments of the present invention will be described below with reference to the accompanying drawings.

First Embodiment

Figure 5:
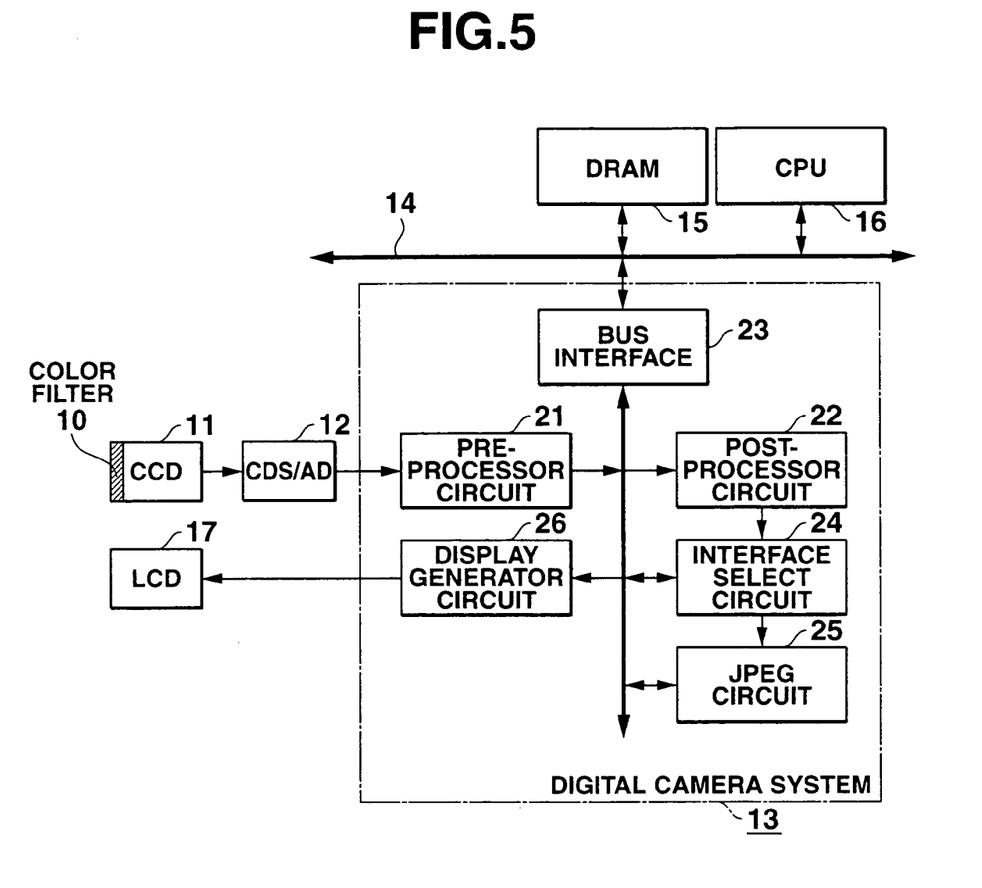
FIG. 5 is a block diagram showing the system configuration of an imaging apparatus according to a first embodiment of the present invention, and showing the basic system configuration when a digital camera is given as the imaging apparatus.
Figure 6:
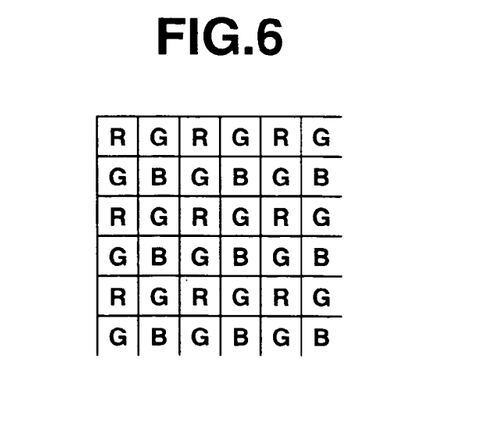
FIG. 6 is a view showing the color filter array provided in a CCD of a digital camera in the first embodiment.

FIG. 5 is a block diagram showing the system configuration of an imaging apparatus according to a first embodiment of the present invention. In FIG. 5, there is shown the basic system configuration when a digital camera is given as the imaging apparatus. FIG. 6 is a view showing one example of the color filter array provided in a CCD of the digital camera.

As shown in FIG. 5, the digital camera of the first embodiment includes CCD 11, CDS/AD 12, camera system circuit 13, system bus 14, DRAM 15, CPU 16, LCD 17, etc.

The CCD 11 is an imaging device for photographing a subject, and outputs an electrical signal corresponding to the incident light. The CCD 11 is provided with a color filter 10 in which three primary colors, that is, R, G and B are arrayed in a predetermined sequence, as illustrated in FIG. 6. The array shown in FIG. 6 is a general Bayer array. More specifically, G having high ratio contributing to luminance signal is arrayed like a checkered pattern at the unit of a pixel. R and B are further arrayed like a checkered pattern in the remaining portions other than above. The light passes through the color filter 10, and thereby, the CCD 11 outputs signals (R, G and B signals) according to the color array of the color filter 10.

The CDS/AD 12 is an analog signal processing circuit for processing an analog signal output from the CCD 11. The CDS is a correlated double sampling circuit. The output signal (video signal) of the CCD 11 is converted into a digital signal via the CDS/AD 12, and thereafter, in putted to the camera system circuit 13.

The camera system 13 is composed of pre-processor circuit 21, post-processor circuit 22, bus interface 23, interface select circuit 24, JPEG (Joint Photograph coding Experts Group) circuit 25 and display generator circuit 26.

The pre-processor circuit 21 is a signal processing circuit for processing CCD data converted into digital signal via the CDS/AD 12. For example, the pre-processor circuit 21 makes defect correction, black level correction and gain control (see FIG. 1). The signal processing by the pre-processor circuit 21 is carried out in synchronous with the CCD 11, and the CCD data after the processing is held in the DRAM used as buffer memory.

The post-processor circuit 22 is a signal processing circuit for carrying out color processing with respect to the CCD data loaded to the DRAM 15. The processing by he post-processor circuit 22 includes various processings such as color interpolation, gain control, color control and gamma conversion. The configuration of the post-processor circuit 22 will be explained later with reference to FIG. 7.

The bus interface 23 is an interface for making data exchange (input/output) between the CPU 16 and the camera system circuit 13. The interface select circuit 24 selectively outputs the final image data obtained from the post-processor circuit 22 to display or recording system. The display system is provided with the display generator circuit 26. The display generator circuit 26 loads the image data to a VRAM (not shown) to display it on a screen of the LCD 17. On the other hand, the recoding system is provided with the JPEG circuit 25. The JPEG circuit 25 compresses data according to adaptive discrete cosine transformation (ADCT) and entropy coding, that is, Huffman coding, and records it in recording memory (not shown).

The DRAM 15 has a capacity capable of holding CCD data equivalent to one screen as buffer memory. The CPU 16 is a main control unit for controlling the whole of the digital camera. The CPU 16 reads programs stored in a ROM (not shown), and carries out various processing according to the procedures described in the programs. The CPU 16 controls AF, AE and AWB functions included in the digital camera.

The LCD 17 comprises a color liquid crystal panel with backlight, and has a predetermined size screen. The LCD 17 makes monitor display of a through image as an electronic finder in the recording mode and displaying a selected image in the reproduction (replay) mode.

According to the foregoing configuration, the signal output from the CCD 11 having the color filter 10 is digitized by the CDS/AD 12, and thereafter, input as CCD data to the camera system circuit 13. The CCD data input to the camera system circuit 13 is subjected to predetermined processings including defect correction by the pre-processor circuit. Thereafter, the CCD data is loaded into the buffer memory, that is, DRAM 15 via the bus interface 23. When CCD data equivalent to one screen is loaded into the DRAM 15, the CCD data is read, and thereafter, supplied to the post-processor circuit 22. For example, color processing including color interpolation is carried out in the post-processor circuit 22.

Figure 7:
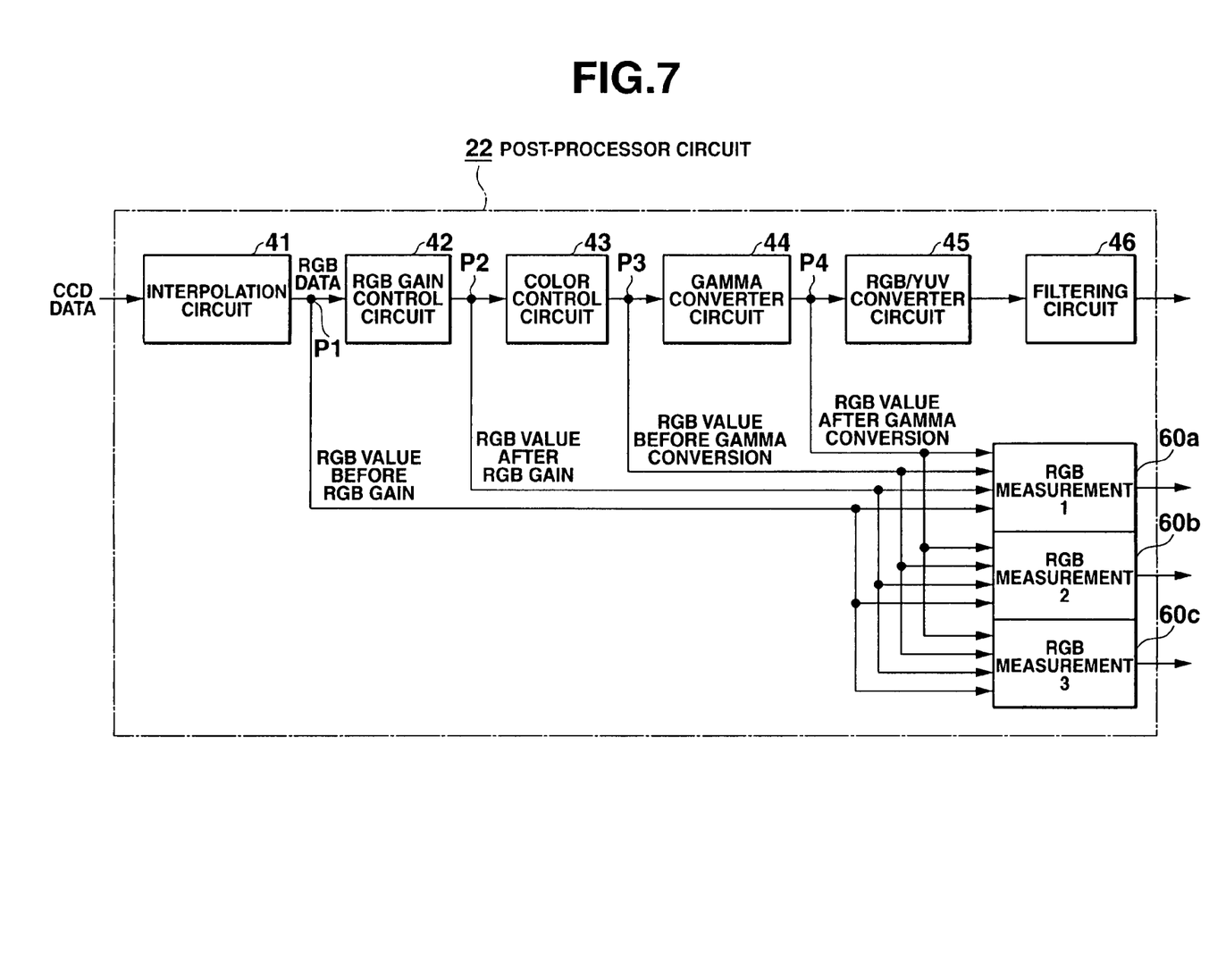
FIG. 7 is a block diagram showing the configuration of a post-processor circuit provided in the digital camera in the first embodiment.

FIG. 7 shows the configuration of the post-processor circuit 22. The post-processor circuit 22 is composed of interpolation circuit 41, RGB gain control circuit 42, color control circuit 43, gamma converter circuit 44, RGB/YUV converter circuit 45 and filtering circuit 46.

The interpolation circuit 41 interpolates color lacking in each pixel with respect to the input CCD data to generate RGB data (color data). The RGB gain control circuit 42 makes gain control for the RGB data generated by the interpolation circuit 41. The color control circuit 43 makes color control for emphasizing predetermined color. The gamma converter circuit 44 makes a conversion in accordance with display gamma characteristics. The RGB/YUV converter circuit 45 converts an RGB signal into a YUV signal. The filtering circuit 46 filters, that is, shapes a waveform of the YUV signal.

The finally obtained image data via the post-processor circuit 22 is displayed on the LCD 17 while being compressed by the JPEG circuit 25 at shutter depress timing, and thereafter, recorded in a recording memory.

In the first embodiment, the post-processor circuit 22 is provided with RGB measurement circuits 60a to 60c as seen from FIG. 7. The RGB measurement circuits 60a to 60c have the same function, and make measurement in the following manner. The RGB measurement circuits 60a to 60c each have a measurement point before and after at least one of circuits constituting the post-processor circuit 22, and selectively capture RGB data obtained at the measurement point.

In FIG. 7, the input side of the RGB gain control circuit 42 included in the post-processor circuit 22 is set as a measurement point P1. The output side of the RGB gain control circuit 42 is set as a measurement point P2. The input side of the gamma converter circuit 44 is set as a measurement point P3, and the output side of the gamma converter circuit 44 is set as a measurement point P4. The RGB data is extracted from these four measurement points P1 to P4, and then, supplied to RGB measurement circuits 60a to 60c. In this case, an RGB value before gain control by the RGB gain control circuit 42 is given from the measurement point P1. An RGB value after gain control by the RGB gain control circuit 42 is given from the measurement point P2. An RGB value before gamma conversion by the gamma converter circuit 44 is given from the measurement point P3. An RGB value after gamma conversion by the gamma converter circuit 44 is given from the measurement point P4.

Figure 8:
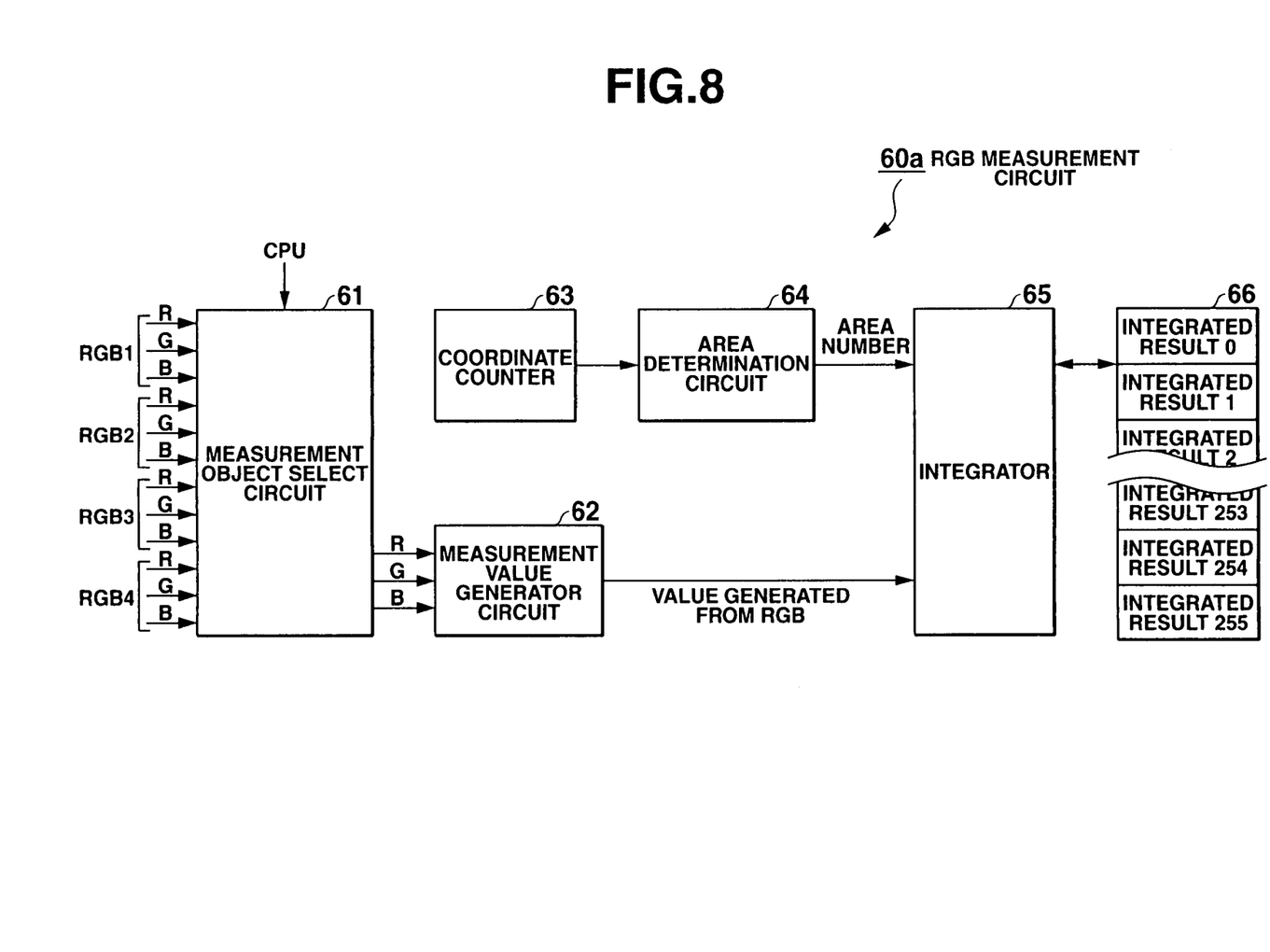
FIG. 8 is a block diagram showing the configuration of an RGB measurement circuit provided in the digital camera in the first embodiment.

The configuration of the RGB measurement circuits 60a to 60c will be described below. The RGB measurement circuits 60a to 60c each have the same configuration; therefore, the configuration of the RGB measurement circuit 60a will be explained for convenience of explanation.

As shown in FIG. 8, the RGB measurement circuit 60a is composed of measurement object select circuit 61, measurement value generator circuit 62, coordinate counter 63, area determination circuit 64, integrator 65 and register group 66.

The measurement object select circuit 61 has four RGB data input sections corresponding to the foregoing measurement points P1 to P4. The circuit 61 selects one of four RGB data according to the instruction from the CPU 16, and thereafter, outputs the selected RGB data as measurement data to the circuit 62. The measurement value generator circuit 62 inputs the RGB data selected by the circuit 61. Then, the measurement value generator circuit 62 generates a measurement value corresponding to the measurement object, and thereafter, outputs it to the integrator 65. The configuration of the measurement value generator circuit 62 will be described later with reference to FIG. 9.

The coordinate counter 63 generates coordinates. The area determination circuit 64 determines the area to which the coordinates generated by the coordinate counter 63 belongs. The circuit 64 then generates data representing the number of the area determined. This data is output to the integrator 65.

The integrator 65 is supplied with an area number from the area determination circuit 64 for each area of image. In addition, the integrator 65 is supplied with the measurement value corresponding to the measurement object from the measurement value generator circuit 62. By doing so, predetermined measurement (integration in this case) is made, and thereafter, the measurement result is written in the register group 66.

If an image is divided into 256 areas (=16×16), area numbers 0 to 255 are given in each area (see FIG. 3). The register group 66 is composed of 256 registers corresponding to the area numbers 0 to 255, and holds the measurement result obtained from the integrator 65 for each area.

With the foregoing configuration, each RGB data extracted from the measurement points P1 to P4 of the post-processor circuit 22 shown in FIG. 7 is input to the circuit 61 of the RGB measurement circuit 60a. One set of RGB data is selected, and then, supplied to the measurement value generator circuit 62. Thereafter, a measurement value corresponding to the measurement object is generated from the selected RGB data. The measurement value corresponding to the measurement object means a value extracting only R component from the RGB data if R data of the image is measured.

In the coordinate counter 63, an input value coordinate is generated. Then, the area number belonging to the coordinate is determined by the area determination circuit 64, and thereafter, input to the integrator 65. When inputting the area number from the area determination circuit 64, the integrator 65 read the value corresponding to the area number from the corresponding register of the register group 66. Then, the integrator 65 adds a value output from the measurement value generator circuit 62, and thereafter, writes it as the integrated result.

Likewise, the measurement value output from the measurement value generator circuit 62 is integrated. Thereafter, the integrated result is successively written in the register shown by the corresponding area number of the register group 66 according to the area number output from the area determination circuit 64. Measurement ends when the measurement results relevant to all areas are held in the register group 66.

Incidentally, according to the conventional configuration, measurement has been made for each color data of R, G and B (see FIG. 3). In this case, the foregoing register group is prepared for each color of R, G and B, and each color data of R, G and B is measured in time division while the selector selects the register group. Thereafter, the measured result must be held in the register group corresponding to each color. On the contrary, the RGB measurement circuit 60a makes measurement based on data generated finally as RGB data. Therefore, there is no need of selecting the register group for each color data of R, G and B. In addition, the measured result obtained by the integrator 65 is held in one register group 66.

RGB measurement circuits 60b and 60c each have the same configuration as described above. These RGB measurement circuits 60b and 60c are synchronous, and capture RGB data on measurement points P1 to P4. In this way measurement is made using the RGB data of an arbitrary measurement point of these measurement points. In this case, different measurement is simultaneously made using the RGB data on the same measurement point. For example, the RGB measurement circuit 60a measures R color data. The RGB measurement circuit 60b measures Y (luminance), and the RGB measurement circuit 60c measures the balance of R and B.

In addition, the RGB measurement circuit 60a measures the RGB data on the measurement point P1. The RGB measurement circuit 60b measures the RGB data on the measurement point P2, and the RGB measurement circuit 60c measures the RGB data on the measurement point P3. As described above, RGB data on different measurement point is selectively captured, and thereby, it is possible to simultaneously make the same or different measurement based on the selected RGB data.

The individual measured results obtained by the RGB measurement circuits 60a to 60c are held in the register group 66 provided in each circuit. The register group 66 is connected to the system bus 14 shown in FIG. 5. The CPU 16 reads the measured result of each register group 66 via the system bus 14, and thereby, uses it for the controls of AF, AE and AWB functions.

Figure 9:
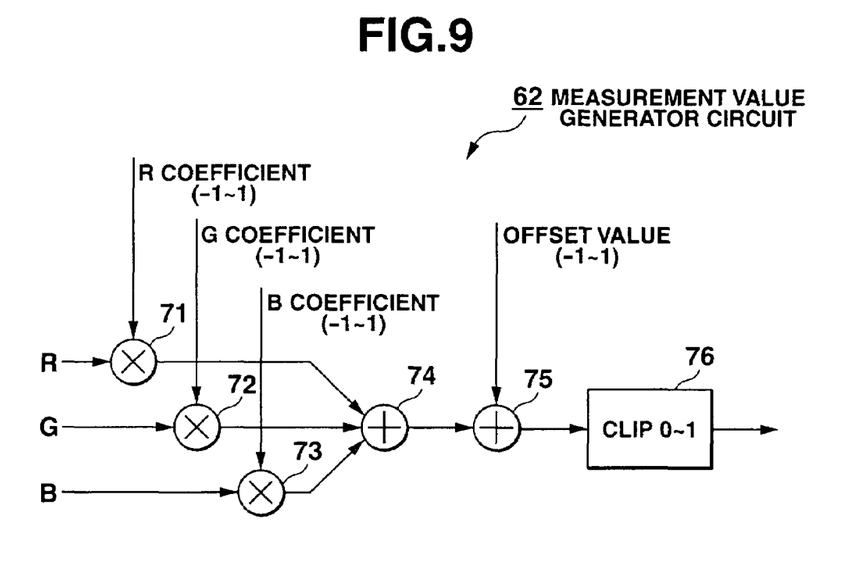
FIG. 9 is a block diagram showing the configuration of a measured value generator circuit provided in the digital camera in the first embodiment.
Figure 10:
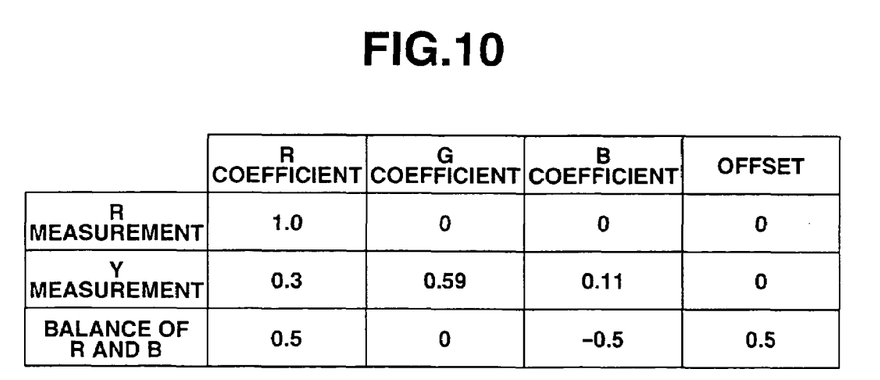
FIG. 10 is a chart to explain the relationship between measured values, coefficients and offset values in the digital camera in the first embodiment.

FIG. 9 is a block diagram showing the configuration of the measurement value generator circuit 62 included in each of the RGB measurement circuits 60a to 60c. FIG. 10 is a chart to explain the relationship between measurement value, coefficient and offset value in the measurement value generator circuit 62.

The circuit 62 inputs one set of RGB data selected by the measurement object select circuit 61 to generate a measurement value corresponding to the measurement object from the input RGB data. Generating the measurement value corresponding to the measurement object means the following matter. For example, if Y (luminance) is measured, a Y value is calculated from each value of RGB data.

As depicted in FIG. 9, the measurement value generator circuit 62 is composed of multipliers 71 to 73, adders 74, 75 and clipping circuit 76. The multipliers 71 to 73 are provided correspondingly to each value of R, G and B, and multiply each value by coefficient preset correspondingly to the measurement object. The adder 74 adds the operational result of these multipliers 71 to 73. The adder 75 adds an offset value to the operational result of the adder 74. The clipping circuit 76 clips the operational result of the adder 75.

R, G and B of the input RGB data are supplied to multipliers 71 to 73, respectively, and then, each coefficient corresponding to the measurement object is multiplied therein. Each coefficient has a range from −1 to 1, and the value corresponding to the measurement object is set in the range.

More specifically, if "R measurement" is made, the coefficient of R is set to 1.0 while the coefficients of other G and B are set to 0, as seen from FIG. 10. If "Y (luminance) measurement" is made, according to the luminance signal calculation (Y=0.3R+0.59G+0.11B) by the Bayer array, the coefficients of R, G and B are set to 0.3, 0.59 and 0.11, respectively.

If "balance measurement of R and B" is made, the coefficients of R, G and B are set to 0.5, 0 and −0.5, respectively. However, in this case, negative coefficient is used; for this reason, an offset value 0.5 must be added for compensation. The offset value has a range from −1 to 1, like the coefficients. The CPU 16 sets the coefficient value and the offset value in the register.

The adder 74 adds R, G and B values multiplied by the coefficients preset correspondingly to the measurement object, and as the need arises, the adder 75 adds the offset value thereto. Further, the R, G and B values are output after being clipped to a range from 0 to 1 by the clipping circuit 76. The clipping circuit 76 makes adjustment so that the value obtained as the operational result does not exceed 1 or become smaller than −1. The value via the clipping circuit 76 is supplied to the integrator 65 as a measurement value corresponding to the measurement object.

As described above, the measurement value generator circuit 62 is provided, and thereby, the following measurement is made. That is, various measurement values generated from RGB data including luminance value are directly supplied to the integrator 65. Therefore, there is no need to calculate the measurement values corresponding to the measurement object from RGB values (integrated results) for each of R, G and B measurements using software, like the conventional case (see FIG. 3). As a result, it is possible to simply and rapidly obtain the measured results using the integrator 65.

The measurement point of the RGB value is not fixed to one point. As shown in FIG. 7, several measurement points such as P1 to P4 are given in the processing circuits included in the post-processor circuit 22. By doing so, it is possible to capture the RGB value obtained at each measurement point, and to make measurement using them arbitrarily and selectively. Therefore, if the measurement points on R, G and B are changed to make measurement, the measurement result at each point is simply obtained without making calculation using the software like the conventional case.

The foregoing RGB measurement circuit is located in the post-processor system, which is not synchronous with the CCD 11. By doing so, the CCD data of a certain frame is repeatedly from the DRAM 15 as much as possible, and thereafter, it is possible to carry out several-time measurements.

Several RGB measurement circuits are provided, and thereby, various measurements are simultaneously made. In this case, the coefficient set in the measurement value generator circuit 62 is previously changed in each RGB measurement circuits. By doing so, different measurements are simultaneously made using RGB data obtained by one-time photography without repeating the photographic operation. In addition, the measurement point is changed, and thereafter, the same or different measurement is simultaneously made. Some RGB measurement circuits are properly combined to make various measurements, and thereby, various measured results can be simply and rapidly obtained.

The first embodiment has explained about the case where three RGB measurement circuits are provided. However, the number of the RGB measurement circuits is not specially limited. For example, three or more RGB measurement circuits may be provided to simultaneously make various measurements.

As seen from FIG. 7, four measurement points are preset, and RGB data is obtained from four measurement points. In this case, at least one processing circuit is used as the object, and the RGB data may be obtained from two measurement points before and after the processing circuit. The measurement point may be arbitrarily set and determined in accordance with the measurement object.

The number of the divided areas of image is set to 256, and the area determination circuit 64 determines the area number. The number of the divided areas other than above may be used.

The process of adding the offset value is carried out on the way of the measurement value generating process by the measurement value generator circuit 62. The process may be omitted, and not necessarily required. The range excepting the range from −1 to 1 may be used.

The clipping process from 0 to 1 is made in the final stage of generating the measurement value. Likewise, the clipping process may be omitted, and not necessarily required. Different clipping range may be used.

Second Embodiment

The second embodiment of the present invention will be explained below.

According to the second embodiment, another measurement object (histogram) is measured.

Figure 11:
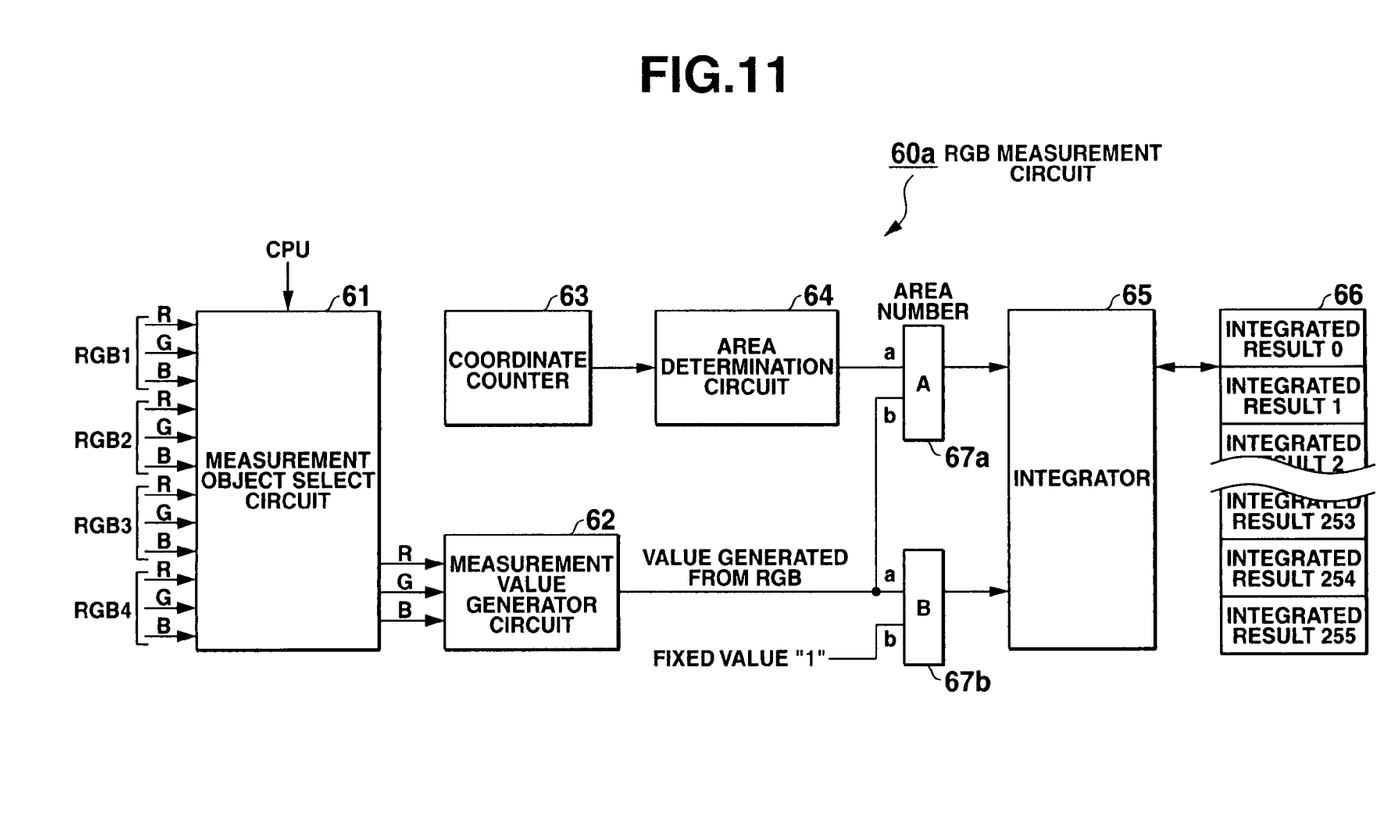
FIG. 11 is a block diagram showing the system configuration of an RGB measurement circuit of a digital camera according to a second embodiment of the present invention.

FIG. 11 is a block diagram showing the configuration of RGB measurement circuit 60a to 60c according to the second embodiment of the present invention. The RGB measurement circuit 60a to 60c each have the same configuration; therefore, the configuration of the RGB measurement circuit 60a will be described for convenience of explanation. The same reference numerals are used to designate components identical to FIG. 8 described in the first embodiment. Only different points will be explained below.

According tot eh second embodiment, two select circuits 67a and 67b are additionally provided with respect to the configuration shown in FIG. 8. One select circuit 67a has two input terminals a and b. The select circuit 67a selects the area number, which is the output of the area determination circuit 64, or the measurement value (generated from RGB in accordance with measurement object), which is the output of the measurement value generator circuit 62. Thereafter, the select circuit 67a supplies the selected value to the integrator 65. The other select circuit 67b has two input terminals a and b. The select circuit 67b selects the measurement value (generated from RGB in accordance with measurement object), which is the output of the measurement value generator circuit 62 or fixed value "1". Thereafter, the select circuit 67b supplies the selected value to the integrator 65.

The foregoing two select circuits 67a and 67b are operated in synchronous with each other according to the switchover instruction from the CPU 16. If the select circuit 67a selects the input terminal a, the select circuit 67b also selects the input terminal a. If the select circuit 67a selects the input terminal b, the select circuit 67b also selects the input terminal b.

If both select circuits 67a and 67b select the input terminal a, these circuits make the same operation as the first embodiment. More specifically, the integrator 65 is supplied with the area number from the area determination circuit 64 via the select circuit 67a. On the other hand, the integrator 65 is supplied with RGB data value of measurement object from the measurement value generator circuit 62 via the select circuit 67b. Thus, the integrator 65 measures the measurement value (generated from RGB data) output from the measurement value generator circuit 62 according to the area number output from the area determination circuit 64. The integrator writes the measured result (integrated result) in the register shown by the corresponding area number in the register group 66.

The following is an explanation about the case where both select circuits 67a and 67b select the input terminal b.

If the select circuit 67a selects the input terminal b, the integrator 65 is supplied with the measurement value generated from RGB data by the circuit 62 in place of the area number. In this case, if the measurement value takes values from 0 to 255 in accordance with the number of the divided areas of image, when the measurement value is "0", the register 0 is selected. When the measurement value is "1", the register 1 is selected. When the measurement value is "2", the register 2 is selected. As described above, a register in which data should be written is selected from the register group 66 in accordance with the measurement value.

On the other hand, if the select circuit 67b selects the input terminal b, the integrator 65 is always supplied as data with the fixed value "1" in place of the measurement value. Thus, the integrator 65 writes the fixed value "1" input via the select circuit 67b in the register corresponding to the measurement value (0 to 255) in the register group 66.

In a state that both select circuits 67a and 67b select the input terminal b, the integrator 65 operates as a counter. That is, the integrator 65 successively adds the fixed value "1" in the register corresponding to the measurement value generated by the measurement value generator circuit 62. Thus, the following coefficients are previously set as described in the first embodiment. That is, coefficients (R coefficient: 0.3, G coefficient: 0.59, B coefficient: 0.11) for generating luminance signal (Y signal) are set in multipliers 71 to 73 forming the measurement value generator circuit 62. Luminance histogram is obtained in the following manner.

More specifically, the foregoing coefficients are set, and thereby, luminance signal (Y signal) having values from 0 to 255 is generated. The luminance signal is input to the integrator 65 via the select circuit 67a. On the other hand, the integrator 65 is supplied with the fixed value "1" as a specified measurement object value via the select circuit 67b. Thus, "1" is counted with respect to the corresponding register in the register group 66 in accordance with the luminance signal value.

For example, if the luminance signal value is "3", "1" is counted with respect to the register corresponding to the area number 3. In this case, the initial value of each register is set to "0", and count increases one by one from the initial value. According to the count operation described above, each register value of the register group 66 is finally obtained as luminance histogram having 256 gradations.

As described above, select circuits 67a and 67b are added to the configuration of the first embodiment, and the input value to the integrator 65 is changed. According to the simple configuration, luminance histogram is contained. Therefore, there is no need of providing a measurement circuit for only histogram, which is located independently from the RGB measurement circuit like the conventional case. As a result, the apparatus is miniaturized, and cost reduction is achieved. In addition, the foregoing luminance histogram is realized using hardware without depending on the process by software. Therefore, load to the CPU 16 is reduced, and thus, histogram is speedily obtained while being used for the control of AE function.

RGB measurement circuits 60b and 60c each have the same configuration. In this case, the measurement point is changed in each of the measurement circuits 60a to 60c, and then, RGB data is captured. By doing so, it is possible to simultaneously obtain luminance histogram at different measurement point using RGB data obtained by one-time photography without repeating the photographing operation.

The coefficient set in the measurement value generator circuit 62 is changed in each of the measurement circuits 60a to 60c. In this way, it is possible to simultaneously obtain various measurement histograms other than luminance. In also case, the measurement point is changed, and thereby, various combinations are possible.

The measurement circuits 60a to 60c do not necessarily have the same configuration. For example, at least any one of the measurement circuits 60a to 60c has the configuration of the second embodiment while the others thereof have the configuration of the first embodiment. Various combinations are possible in accordance with the use.

In the second embodiment, the measurement value is set to the range from 0 to 255; in this case, any other ranges may be employed so long as the range has at least two elements or more.

The fixed value of the measurement value input to the integrator is set to "1"; in this case, any other values may be employed so long as the value is not "0".

In the first and second embodiments, the RGB data is an object that should be measured. Nonetheless, the CCD data (i.e., Bayer data) may be measured in a process similar to the process described above.

In brief, the present invention is not limited to the foregoing embodiments. Constituent components may be modified and embodied within the scope without diverging from the subject matter at the working stage. Several constituent components disclosed in the embodiments are properly combined, thereby forming various inventions. For example, some components may be deleted from all constituent components disclosed in the embodiments. Constituent components relevant to different embodiments may be properly combined.

What is claimed is:

1. An imaging apparatus comprising:
  an imaging unit capable of color imaging;
  a first processing unit which carries out predetermined color processing with respect to color image data output from the imaging unit;
  a first extraction unit which extracts color image data before the predetermined color processing is carried out by the first processing unit;
  a second extraction unit which extracts color image data after the predetermined color processing is carried out by the first processing unit;
  a first selection unit which selects arbitrary color image data of several color image data extracted by the first and second extraction units;
  a second selection unit which selects arbitrary color image data of several color image data extracted by the first and second extraction units;
  a first measurement unit which makes a predetermined measurement based on the color image data selected by the first selection unit; and
  a second measurement unit which makes a predetermined measurement based on the color image data selected by the second selection unit.

2. The apparatus according to claim 1, wherein the predetermined measurements made by the first and second measurement units are different from each other.

3. The apparatus according to claim 1, wherein the predetermined measurements made by the first and second measurement units are the same.

4. The apparatus according to claim 1, wherein the first selection unit selects the color image data extracted by the first extraction unit, and the second selection unit selects the color image data extracted by the second extraction unit.

5. The apparatus according to claim 1, wherein the first and second selection units both select the color image data extracted by the first extraction unit.

6. The apparatus according to claim 1, wherein the first and second selection units both select the color image data extracted by the second extraction unit.

7. The apparatus according to claim 1, further comprising:
  a second processing unit which carries out color processing different from the predetermined color processing with respect to color image data after the predetermined color processing is carried out by the first processing unit; and
  a third extraction unit which extracts color image data after the color processing is carried out by the second processing unit,
  wherein the second extraction unit extracts color image data after the predetermined color processing is carried out by the first processing unit and before the color processing is carried out by the second processing unit, and the first and second selection units select one of several color image data extracted by the first to third extraction units.

8. The apparatus according to claim 7, further comprising:
  a third processing unit which carries out color processing different from the color processing carried out by the first and second processing units with respect to color image data after the color processing is carried out by the second processing unit; and
  a fourth extraction unit which extracts color image data after the color processing is carried out by the third processing unit,
  wherein the third extraction unit extracts color image data after the color processing is carried out by the second processing unit and before the color processing is carried out by the third processing unit, and the first and second selection units select one of several color image data extracted by the first to fourth extraction units.

9. The apparatus according to claim 1, wherein the first processing unit carries out gain control processing with respect to color image data output from the imaging unit.

10. The apparatus according to claim 1, wherein the first processing unit carries out color control processing with respect to color image data output from the imaging unit.

11. The apparatus according to claim 1, wherein the first processing unit carries out gamma conversion processing with respect to color image data output from the imaging unit.

12. The apparatus according to claim 1, further comprising:
  a buffer memory for holding color image data output from the imaging unit, which is equivalent to at least one screen,
  wherein the first processing unit carries out the predetermined color processing with respect to the color image data read from the buffer memory.

13. The apparatus according to claim 1, further comprising:
  a measurement value generator unit which generates a measurement value corresponding to a measurement object from the color image data selected by the first and second selection units,
  wherein the first and second measurement units make the predetermined measurement based on the measurement value generated by the measurement value generator unit.

14. An imaging apparatus comprising:
  an imaging device capable of color imaging;
  a processing circuit which carries out predetermined color processing with respect to color image data output from the imaging device;
  a first data select circuit which selects one of area number data showing each area when the color image data is divided into a predetermined size and color image data input as a measurement object from the processing circuit;
  a second data select circuit which selects one of the color image data and a fixed value data used for a specified measurement object in response to a data select operation by the first data select circuit;
  a plurality of memories provided correspondingly to the area number data, and
  a measurement circuit which makes a predetermined measurement based on the color image data selected by the second data select circuit when the first data select circuit selects the area number data, writes the result in one of the memories corresponding to the area number data, and writes the fixed value data selected by the second data select circuit in one of the memories corresponding to the color image data when the first data select circuit selects the color image data.

15. An imaging apparatus comprising:

imaging means for performing color imaging;

first processing means for carrying out predetermined color processing with respect to color image data output from the imaging means;

first extraction means for extracting color image data before the predetermined color processing is carried out by the first processing means;

second extraction means for extracting color image data after the predetermined color processing is carried out by the first processing means;

first selection means for selecting arbitrary color image data of several color image data extracted by the first and second extraction means;

second selection means for selecting arbitrary color image data of several color image data extracted by the first and second extraction means;

first measurement means for making a predetermined measurement based on the color image data selected by the first selection means; and second measurement means for making a predetermined measurement based on the color image data selected by the second selection means.

16. A method of measuring color image data, comprising:

carrying out predetermined color processing with respect to color image data output from an imaging device;

extracting color image data before the predetermined color processing is carried out and color image data after the predetermined color processing is carried out, selecting arbitrary first color image data of the extracted color data;

selecting arbitrary second color image data of the extracted color data;

making a predetermined first measurement based on the selected first color image data using a first measurement circuit; and making a predetermined second measurement based on the selected second color image data using a second measurement circuit.

* * * * *